April 29, 1924.
G. B. HAINES
FRUIT PICKER'S BASKET
Filed July 13, 1922
1,492,453
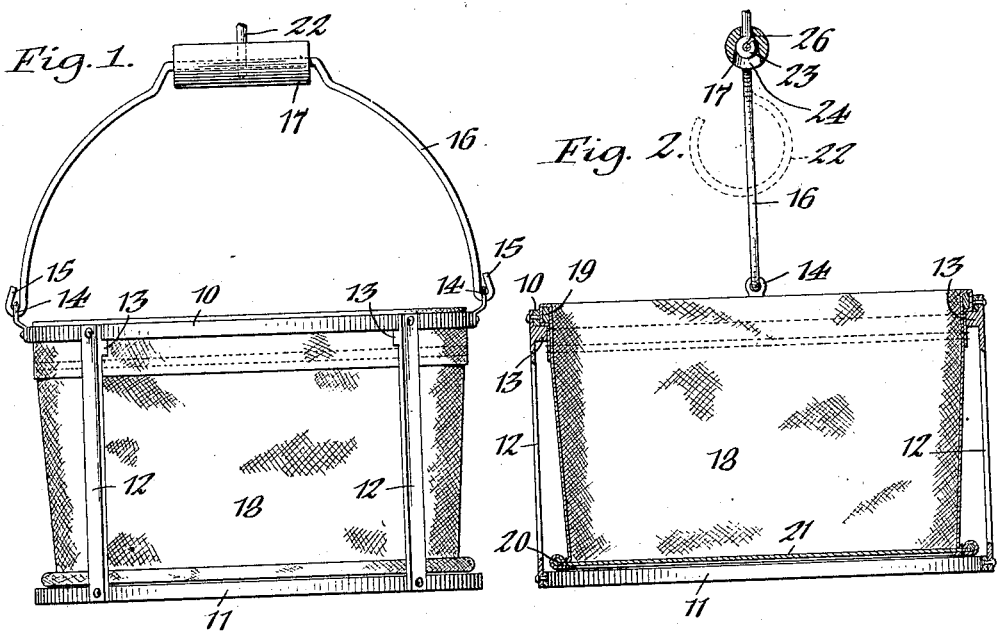
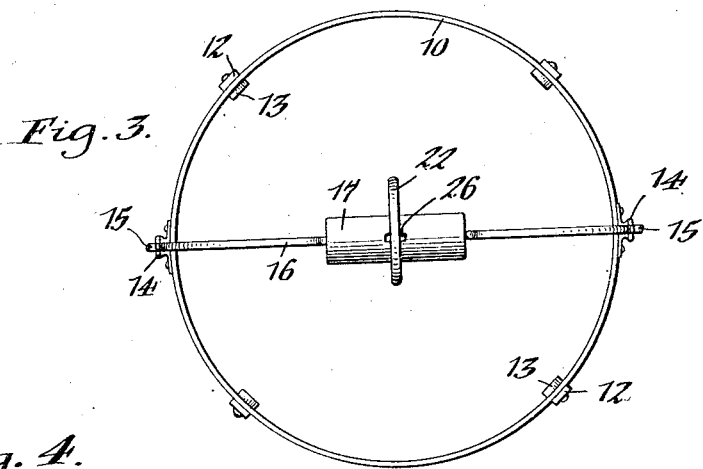
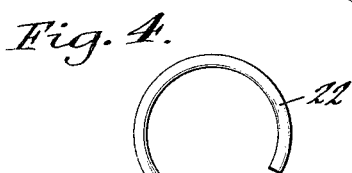
Inventor;
George B. Haines,
by Geyer Pope
Attorneys.

Patented Apr. 29, 1924.

1,492,453

UNITED STATES PATENT OFFICE.

GEORGE B. HAINES, OF LOCKPORT, NEW YORK.

FRUIT-PICKER'S BASKET.

Application filed July 13, 1922. Serial No. 574,607.

*To all whom it may concern:*

Be it known that I, GEORGE B. HAINES, a citizen of the United States, residing at Lockport, in the county of Niagara and State of New York, have invented new and useful Improvements in Fruit-Pickers' Baskets, of which the following is a specification.

This invention relates generally to receptacles but more particularly to a basket adapted for use by fruit pickers and the like.

One of its objects is to provide a simple and inexpensive basket of this character which is not liable to bruise or injure the fruit while it is being gathered and thrown into the basket.

Another object is to provide a fruit picker's basket which is strong and durable in construction, and which is constructed so that the basket proper is readily removable from its supporting frame.

A still further object is to provide the bail or handle of the basket with a novel, permanently attached suspension hook which is not liable to be lost or misplaced and which at the same time does not interfere with the convenient carrying of the basket.

In the accompanying drawings: Figure 1 is a side elevation of a basket embodying my invention. Figure 2 is a transverse vertical section thereof. Figure 3 is a top plan view of the basket-supporting frame. Figure 4 is an enlarged cross section of the bail-handle and its suspension hook.

Similar characters of reference indicate corresponding parts throughout the several views.

The improved receptacle comprises a skeleton supporting frame, preferably of metal, and a flexible basket suspended within said frame. The latter preferably comprises horizontal upper and lower hoops or bands 10, 11, which are rigidly held in spaced relation by upright tie bars 12 riveted or otherwise securely fastened at their ends to the corresponding hoops, preferably on their outer sides, as shown. Said tie bars are provided near their upper ends and on their inner sides with ledges or projections 13 which extend inwardly beyond the inner face of the upper band 10, as shown in Figs. 2 and 3. At its diametrically opposite sides, the upper band is provided with ears 14 for receiving the hooked ends 15 of a suitable supporting bail 16 provided with a central handle 17.

Removably suspended within this frame is the basket or container 18 for the fruit. This basket is constructed of a flexible material, such, for example, as canvas, and is reinforced at its upper and lower ends by rings 19 and 20, respectively. The upper and lower portions of the basket-material are folded or wrapped around the corresponding reinforcing rings and are stitched or otherwise secured to the body of the basket, as shown in Fig. 2. The upper ring 19 is preferably rectangular in cross section and when the basket is placed within the frame, this ring is adapted to fit within the upper hoop 10 of said frame and rest on the ledges 13 of the tie bars 12, this upper ring thus forming a supporting shoulder for the basket. The lower basket-ring 20 may be round in cross section and is somewhat smaller in diameter than the corresponding frame-hoop 11 so that it may extend or fit into the same under the weight of the contents of the basket. The bottom 21 of the latter, which may also be constructed of canvas or equivalent material, is secured to and stretched upon the lower ring 19 of the basket, and it terminates above the lower edge of the frame to keep the fruit out of contact with the ground. Said ring surrounds the bottom or lower edge of the basket and projects beyond the side walls of the latter to form a guard or rim, as clearly shown in Fig. 2.

By this construction, the bottom and sides of the flexible basket are at all times held away from the frame members 10, 11 and 12, whereby the fruit is prevented from coming in contact therewith and becoming bruised.

It will be noted that the upper end of the basket extends above the upper edge of the frame hoop 10, so that the fruit in being deposited into the basket does not come in contact with the sharp edges of said hoop which might injure it. Bruising of the fruit by the lugs or ledges 13 is also avoided, as they are covered by the canvas-wrapped upper hoop 19 of the basket. Contact of the fruit with the guard ring is prevented by locating the same wholly on the outer side of the basket, as shown.

As the upper end of the basket is loosely seated upon said ledges, it can be readily removed from the frame, if desired, or can be renewed when worn out, without the necessity of renewing the frame as well as the basket, rendering the receptacle more economical in use.

The bail 16 of the basket-frame may be provided with a suitable hook 22 for suspending it from a tree or ladder. This hook is preferably permanently fastened to the bail and for this purpose it is provided with an attaching eye 23 encircling the bail and the handle 17 is provided with a radial recess 24 which extends from the surface to the bore 25 thereof and receives the eye of the hook and a corresponding opening 26 for its shank. In applying the hook to the bail, its eye 23 is first passed through the handle-opening 26 into the recess 24 and the bail-blank is then threaded through the bore of the handle and the eye of the hook, after which the hooks 15 are formed on the ends of the bail and engaged with the ears 14. By this arrangement, the hook is always ready for use and the liability of its becoming lost or misplaced is avoided.

In carrying the basket, the hook 22 is reversed to a pendent position where it is out of the way, as shown by dotted lines in Fig. 2.

I claim as my invention:

1. A receptacle of the character described, comprising a frame including horizontal top and bottom bands and upright tie bars connecting said bands, said tie bars being provided near their upper ends and on their inner sides with ledges, and a flexible basket removably arranged in said frame and provided at its upper and lower ends with hoops, the upper hoop resting upon said ledges and the lower hoop projecting beyond the body of the basket, forming a guard to keep the bottom and walls of the basket out of contact with said frame.

2. A receptacle of the character described, comprising a skeleton frame open at its top and including a vertically-arranged band extending around the top of the frame, said frame being provided near its top with internal ledges, and a flexible basket arranged in said frame and having an upper ring resting on said ledges, said ring being covered by the flexible material of the basket and extending above the upper edge of said band.

3. The combination with a receptacle having a supporting bail, of a handle surrounding said bail, and a suspension hook having an eye encircling said bail within the handle, the shank of said hook extending through said handle.

4. The combination with a receptacle having a supporting bail, of a handle applied to said bail and having a radial recess and an opening in line therewith, and a suspension hook having an eye encircling said bail, said eye and the adjoining portion of the hook-shank being arranged in said recess and said opening, respectively.

GEORGE B. HAINES.